(12) United States Patent
Bigioi et al.

(10) Patent No.: US 11,902,496 B2
(45) Date of Patent: Feb. 13, 2024

(54) DEPTH SENSING CAMERA SYSTEM

(71) Applicant: FotoNation Ltd., Ballybrit (IE)

(72) Inventors: Petronel Bigioi, Galway (IE); Piotr Stec, Galway (IE)

(73) Assignee: FotoNation Limited

( * ) Notice: Subject to any disclaimer, the term of this patent is extended or adjusted under 35 U.S.C. 154(b) by 491 days.

(21) Appl. No.: 16/389,895

(22) Filed: Apr. 19, 2019

(65) Prior Publication Data

US 2020/0186782 A1    Jun. 11, 2020

Related U.S. Application Data

(60) Provisional application No. 62/775,525, filed on Dec. 5, 2018.

(51) Int. Cl.
| | |
|---|---|
| H04N 13/271 | (2018.01) |
| H04N 13/254 | (2018.01) |
| G06T 7/55 | (2017.01) |
| H04N 5/33 | (2023.01) |

(52) U.S. Cl.
CPC ............ *H04N 13/271* (2018.05); *G06T 7/55* (2017.01); *H04N 5/33* (2013.01); *H04N 13/254* (2018.05); *G06T 2207/10028* (2013.01)

(58) Field of Classification Search
CPC ...... H04N 13/271; H04N 13/254; H04N 5/33; G06T 7/55; G06T 2207/10028
See application file for complete search history.

(56) References Cited

U.S. PATENT DOCUMENTS

| | | | | |
|---|---|---|---|---|
| 2005/0111696 A1* | 5/2005 | Baer | ...................... | H04N 7/188 382/218 |
| 2007/0018124 A1* | 1/2007 | Nishi | ................. | G02B 27/0025 250/559.36 |
| 2010/0260494 A1* | 10/2010 | Sutton | .................... | H04N 25/00 348/E5.085 |
| 2011/0199379 A1* | 8/2011 | Benien | .................. | G06T 15/205 345/427 |
| 2015/0009415 A1* | 1/2015 | Wong | .................... | H04N 9/3194 715/746 |
| 2017/0085863 A1* | 3/2017 | Lopez | .................. | H04N 13/261 |
| 2018/0130255 A1* | 5/2018 | Hazeghi | ............... | H04N 13/243 |
| 2019/0174060 A1* | 6/2019 | Oba | ....................... | H04N 7/188 |
| 2020/0013176 A1* | 1/2020 | Kang | ...................... | G06T 7/593 |

FOREIGN PATENT DOCUMENTS

WO     2018037789 A1    3/2018

OTHER PUBLICATIONS

Efficient Confidence Measures for Embedded, Matted Poggi, et al, International Conference on Image Analysis and Processing, ICIAP 2017, Part I, LNCS 10484, pp. 483-494, Oct. 2017.

\* cited by examiner

*Primary Examiner* — Joseph Suh
(74) *Attorney, Agent, or Firm* — Lerner David LLP

(57) ABSTRACT

A depth sensing camera system that comprises one or more fisheye lenses and infrared and/or near-infrared image sensors. In some examples, the image sensors may generate output signals based at least in part on receiving radiation via the fisheye lenses. A depth measurement may be calculated based at least in part on the output signals. For example, these output signals may be provided as input to a depth model, which may determine the depth measurement. In some examples, such a depth model may be integrated into an application-specific integrated circuit and/or may be operated by an application processor.

20 Claims, 6 Drawing Sheets

DEPTH SENSING CAMERA SYSTEM

RELATED APPLICATION

This application claims the benefit of U.S. Provisional Application No. 62/775,525, filed Dec. 5, 2018, which is incorporated herein by reference.

BACKGROUND

Applications for three-dimensional sensing are rapidly increasing. These applications include robotic control, object detection, object recognition, object classification, biometric scanning and/or matching, human behavior recognition, virtual/augmented reality enhancement, and medical diagnostics. However, systems for three-dimensional sensing that yield high-resolution and/or high accuracy remain expensive, require access to a powerful application processor, and consume large amounts of power and processing throughput.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
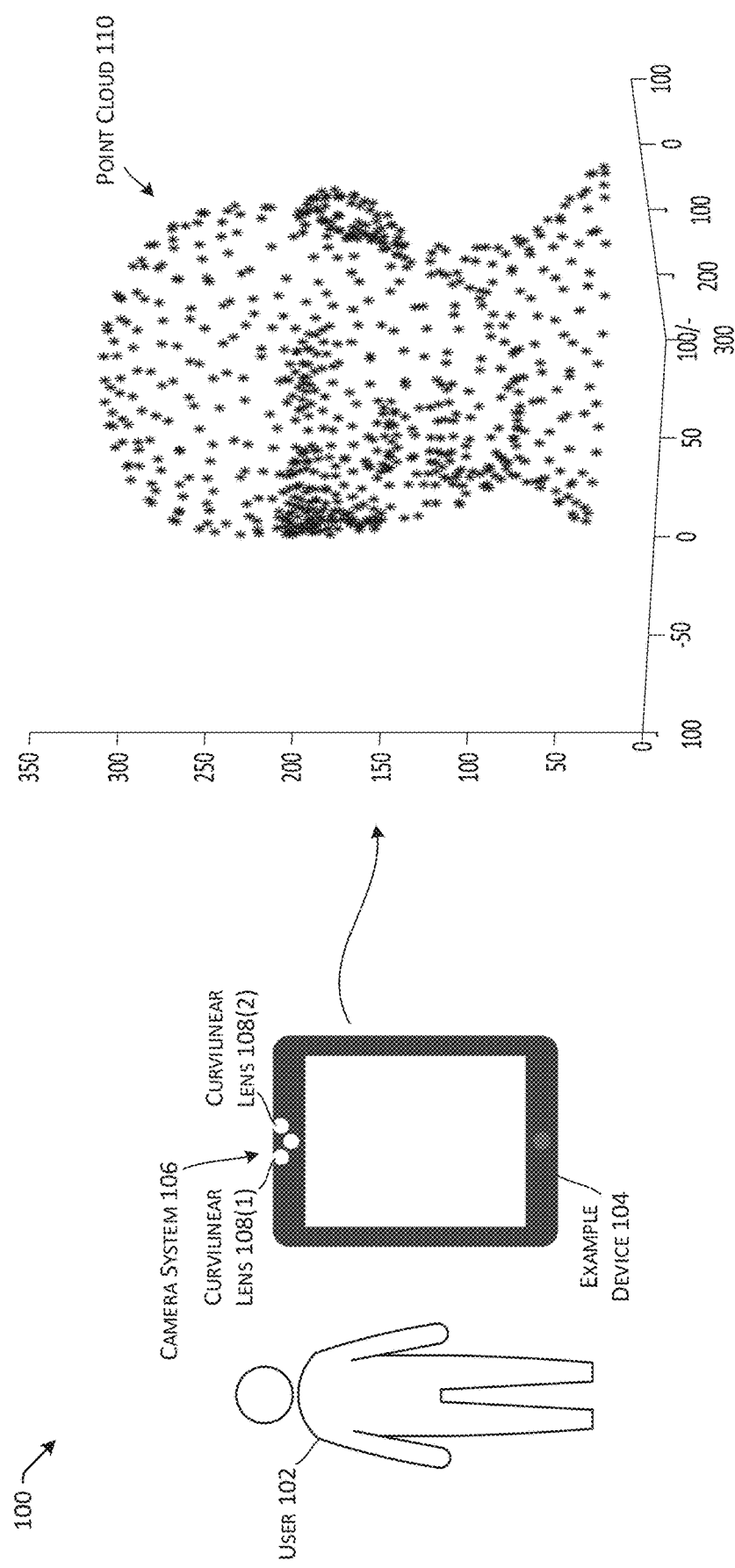
FIG. 1 illustrates a block diagram of an example scenario into which a depth sensing camera system may be integrated and a point cloud that may be output by such a system.

Existing depth camera technologies do not yield accuracies that permit the use of financial-grade biometric scanning and/or recognition. In particular, existing depth camera systems use rectilinear lenses so that the parallax between pixels may be measured easily, which may be used to determine a depth measurement to an object. Moreover, the field of view (FOV) of a rectilinear lens tends to be most suitable for capturing an image of a user. For example, rectilinear lenses traditionally provide a narrower field of view and are therefore used to capture images of a user.

However, contrary to convention, the techniques discussed herein comprise a camera system that replaces a rectilinear lens of a depth sensing system with a fisheye lens. Previous approaches have discouraged use of a fisheye lens because of the distortion the fisheye lens introduces and the difficulty that results in determining a depth measurement therefrom. Moreover, a fisheye lens provides a much larger field of view (FOV) than is necessary to capture an image of a user and may require an image sensor of a higher resolution, if capturing the entire FOV of the fisheye lens is desired.

The camera system discussed herein may comprise a fisheye lens (and/or any other type of fisheye lens) instead of a rectilinear lens, to magnify a central portion of an image captured by the camera, thereby improving biometric scanning/recognition and/or iris detection rates. In some examples, magnifying a central portion of the image may increase the detectability of an iris of a user whose image is captured by the camera system, and, in turn, may improve the accuracy of biometric scanning and/or recognition.

Again, contrary to common motivation to use a fisheye lens, in some examples, the camera system discussed herein may be designed to crop a large portion of the FOV of the fisheye lens so that the resultant image captured by the camera system comprises a central portion of the FOV of the fisheye lens (e.g., 40-65 degrees, as opposed to the typical 130-180 degrees visible in a FOV of a fisheye lens) and crops the remaining available FOV of the projected image.

The described camera system may yield increased accuracy and resolution over existing systems, while reducing false-positive rates (e.g., successfully differentiating between twins in the case of a facial recognition application). For example, by using a fisheye lens (and/or another fisheye lens), the described camera system may be able to accurately detect an iris of a user from a greater distance in comparison to a camera system that utilizes a rectilinear lens. In some examples, this may allow a user to hold a device that includes the camera system at a comfortable distance in order for an iris of the user to be detected, as opposed to some former systems that employ rectilinear lenses that may require a user to hold a device much closer to the user's head. Moreover, use of the fisheye lens may allow a resolution of the image sensors to be reduced in comparison to former depth-sensing cameras. For example, since the fisheye lens introduces a "magnification" effect at the center of the image, thereby enlarging the number of pixels associated with an iris of a user, the image sensor may have a lower resolution and therefore may not require as much processing power to handle the output signal(s) of the sensor(s). In some examples, the techniques discussed herein may additionally or alternatively reduce power consumption and/or an amount of processing bandwidth required to obtain accurate and high-resolution depth maps.

The camera system discussed herein may comprise one or more cameras, where each camera comprises at least a fisheye lens (and/or any other type of fisheye lens) and an image sensor. Incorporation of the fisheye lens may increase iris detection rates, in applications where the depth measurement(s) are being used for biometric recognition, and/or increased object detection accuracy rates, particularly for objects at a greater distance from the camera system. In some examples, incorporation of the fisheye lens may cause light attributable to a central portion of a scene (and corresponding image) to be received by a greater area of an image sensor, as compared with rectilinear and other similar lenses. More pixels may thereby indicate data about a central portion of a scene which, in the case of a "selfie," may include the iris(es) of a user. However, the fisheye lens may introduce distortion that may cause calculating a depth measurement to be more difficult. In some examples, the camera system may comprise one or more machine-learned models that may be trained to calculate a depth measurement based at least in part on ground truth depth measurements and a training set of images captured using a fisheye lens. The resultant machine-learned model, after training, may be equipped to determine a depth measurement based at least in part on image(s) received from the image sensors and lenses of the camera system.

In some examples, the image sensor(s) of the camera system may detect near-infrared or infrared radiation and/or generate output signals based at least in part on near-infrared radiation and/or infrared radiation. Although it is contemplated that the image sensors may additionally or alternatively detect visible light (e.g., wavelengths of about 350 nanometers to about 750 nanometers) and/or other forms of radiation. In some instances, a controller may receive the output signals and determine a depth measurement based at least in part on the output signals. For example, the controller may determine the depth measurement based at least in part on providing, as input to a depth model, the output signals and/or a representation thereof. The depth model may output, based at least in part on the output signals and/or a representation thereof, a depth measurement. In an additional or alternative example, determining the depth measurement may be based at least in part on calculating a disparity map between the output signals. In some examples, the depth measurements may be used to generate a point cloud and/or other representation of three-dimensional surface(s) of one or more objects in an environment. This representation may be used to more accurately identify the location, classification, and/or part(s) of an object, such as a user's iris(es), eyebrows, nose, lips), ears, etc.; the fretboard of a guitar, particular fret(s) of a guitar, a string of a guitar, a knob of a guitar, etc.; and so on.

Example Scenario

FIG. 1 illustrates an example scenario 100 including a user 102 (a human, in this example) and an example device 104 that incorporates the camera system 106 discussed herein. The example device 104 is depicted as a smartphone or tablet, although it is understood that the camera system 106 discussed herein may be incorporated into any device and/or may be a stand-alone device. In the depicted example, the camera system 106 is arranged in a "front"-facing configuration (e.g., a "selfie" camera system designed to sense depth in the direction of a user of the example device 104), although it is understood that the camera system 106 may be integrated into any portion of a device, as may be desired for the particular application of depth sensing.

Although the camera system 106 is depicted in FIG. 1 as comprising three elements (e.g., three cameras), it is understood that the camera system 106 discussed herein may comprise any number of one or more cameras. In the depicted example, the camera system 106 that senses depth may comprise three cameras, although, in an additional or alternate example, the camera system 106 may comprise two of the cameras while the third camera may be an additional camera that may or may not be used for depth sensing (e.g., the additional camera may be relied on for visible light photography—e.g., a "selfie camera"). In some examples, the one (or more) cameras associated used for depth sensing may be associated with a fisheye lens(es) (and/or any other similar lens). For example, the depth sensing camera(s) depicted in the example camera system 106 in FIG. 1 may receive light from fisheye lens 108(1) and/or fisheye lens 108(2). For example, an image sensor associated with the additional camera may comprise more pixels than an image sensor associated with one of the cameras of the two cameras of the depth camera system.

Regardless of the configuration, camera system 106 may generate depth measurement(s) associated with a field of view (FOV) of the camera system 106. For example, if the user 102 is within the FOV of the camera system 106, the camera system 106 may generate a set of depth measurements (e.g., a depth map) associated with a portion of the user 102 and/or any object(s)) that are in the FOV. In some examples, the depth measurements may be represented as a point cloud 110 and/or a depth map, although it is understood that the depth measurements may be represented and/or stored in any of a number of different forms. The camera system 106 may transmit and/or store the depth measurement(s) (and/or a representation thereof like a point cloud). For example, the camera system 106 may transmit the depth measurement(s) to a memory and/or processor of the example device 104 so that a processor of the example device 104 (and/or an unillustrated device) may access the depth measurement(s) for any of a variety of applications (e.g., detecting biometric data, facial recognition, robotic control, object detection, object classification). Note that the illustrated point cloud 110 is simplified in comparison to potential point clouds that may be generated based on the techniques discussed herein. For example, for a pair of 1 megapixel sensors for a two-camera depth system as described herein, the resultant point cloud may comprise more than 40,000 points with an average Hausdorff distance of 2.10 millimeters or greater. This vastly outperforms current time of flight (TOF) depth sensors, which may achieve between 5,000 and 10,000 points and an average Hausdorff distance of 1.8 millimeters.

In some examples, the techniques discussed herein result in a depth map and/or point cloud of a resolution and accuracy that may allow the example device 104 to detect an iris of a user 102. Detecting the iris of the user may be useful for biometric authentication, disambiguating between users in facial recognition applications, tracking eye gaze, automating virtual simulations/overlays on an image, etc. The techniques discussed herein may increase iris detectability, the accuracy of iris detection, the distance from the camera system at which an iris may be detectable, and/or the accuracy of applications of iris-tracking (e.g., the techniques may decrease the false positive rates for facial recognition, increase the accuracy of simulation overlays, increase the accuracy of eye gaze tracking) relative to existing depth sensors.

Example Camera System Architecture

Figure 2:
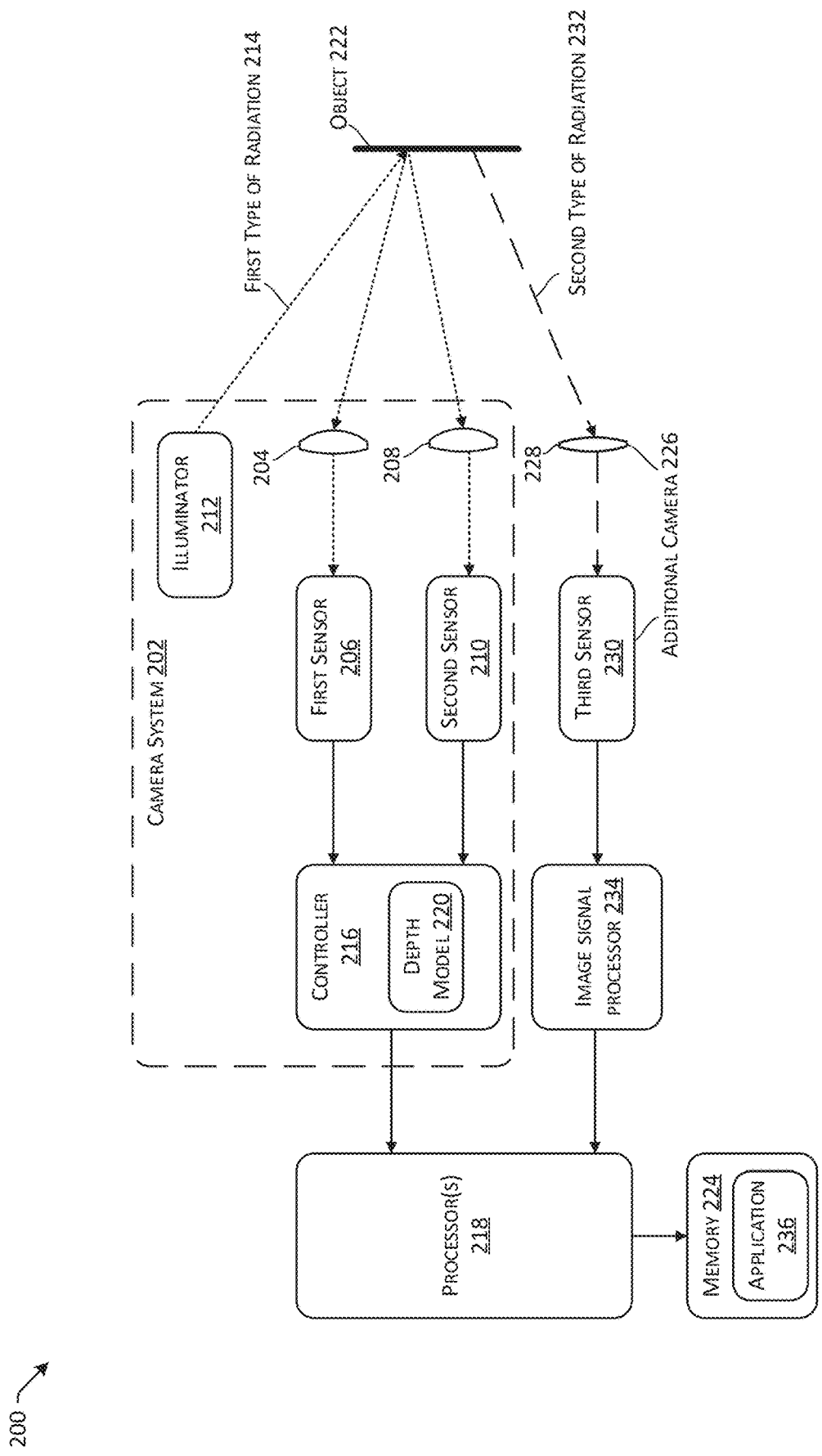
FIG. 2 illustrates a block diagram of an example architecture of a depth sensing camera system.

FIG. 2 depicts a block diagram of an architecture 200 of an example camera system 202 for depth sensing. The camera system 202 is an example camera system that can be used, for example, as the camera system 106 in the example device 104, or as a camera system of any other device or system in which it is desirable to capture depth images. The camera system 202 may comprise one or more cameras, although the example depicted in FIG. 2 is of a stereo camera system. A first camera may comprise at least a first fisheye lens 204 (e.g., and/or any similar lens) associated with a first sensor 206 and a second camera may comprise at least a second fisheye lens 208 associated with a second sensor 210. For example, the first fisheye lens 204 may be associated with the first sensor 206 in that the first fisheye lens 204 may refract light incident on the first fisheye lens 204 towards the first sensor 206.

In some examples, the first fisheye lens 204 and/or the second fisheye lens 208 may have a narrow (for a fisheye lens) FOV of less than 180 degrees and greater than 100 degrees. However, in some examples, the first fisheye lens 204 and/or the second fisheye lens 208 may be designed to receive radiation from a 180 degree or greater FOV.

In some examples, the camera system 202 may additionally or alternatively comprise an illuminator 212, which may emit a first type of radiation 214 into an environment surrounding and/or in front of the camera system 202. A "type" of radiation may comprise a spectrum of wavelengths. In some examples, the illuminator 212 may emit near-infrared and/or infrared light, although, in additional or alternate examples, the illuminator 212 may emit any other wavelength(s) of light. First sensor 206 and/or second sensor 210 may be chosen to detect radiation that includes the spectrum emitted by the illuminator 212. For example, the illuminator 212 may be designed to emit near-infrared and/or infrared radiation and the first sensor 206 and/or the second sensor 210 may generate output signals responsive to receiving at least near-infrared and/or infrared radiation. In some examples, the illuminator 212 may emit light in a pattern such as, for example, a random and/or pseudorandom pattern. In some examples, the illuminator 212 may transmit this pattern to a controller 216, which may aid in stereo matching images received at the controller 216 from the first sensor 206 and the second sensor 210.

In some examples, the first sensor 206 and/or the second sensor 210 may be sensors that detect a same or different type of radiation. For example, the first sensor 206 and/or the second sensor 210 may comprise an electro-optical sensor such as, for example, a photoconductive device, photovoltaic device, a photodiode, and/or a phototransistor. In at least one example, the first sensor 206 and/or the second sensor 210 may generate an output signal based at least in part on near-infrared light and/or infrared light incident to a surface of the first sensor 206 and/or the second sensor 210, respectively. The first sensor 206 and/or the second sensor 210 may additionally or alternatively detect visible light and/or other wavelengths, in additional or alternate examples. For example, in applications for detecting an iris of a user, the first sensor 206 and/or the second sensor 210 may generate an output signal based at least in part on receiving near-infrared and/or infrared light reflected by an object 222 in the environment within a FOV of the first sensor 206 and/or the second sensor 210. In some instances, the light reflected by the object 222 may comprise a first type of radiation 214 emitted by the illuminator 212 and reflected by the object 222 and/or naturally occurring first type of radiation 214 in the environment and reflected by the object 222.

In some examples, the first sensor 206 and/or the second sensor 210 may be crop sensors and/or full frame sensors. In other words, the first sensor 206 may be a crop sensor by virtue of having a sensor surface area that is less than a projected area of the radiation refracted through the first fisheye lens 204 at the sensor surface. In such an example, the first camera associated with the first fisheye lens 204 and the first sensor 206 may comprise one or more additional apertures and/or other apparatus(es) to diffuse or otherwise disseminate and/or block the radiation that is not received by the first sensor 206. In some examples, the first fisheye lens 204 may be designed such that the first fisheye lens 204 and/or an aperture associated with the fisheye lens 204 may reduce the field of view sensed by the first sensor 206 to less than 180 degrees. These and other details are discussed regarding FIGS. 3A-4B.

The camera system 202 may configured such that the first sensor 206 and/or the second sensor 210 transmit output signals generated thereby to controller 216. In some examples, there may be some intermediate electronics, such as amplifier(s), analog-digital converter, noise reduction hardware, interface(s) (e.g., bus, network interface), etc. In some examples, the controller 216 may comprise the intermediate electronics. Regardless, the controller 216 may receive output signals from the first sensor 206 and/or the second sensor 210, which the controller 216 and/or intermediate electronics and/or software may use to generate an image for each sensor and/or a stereo image representing the output signals of the first sensor 206 and/or the second sensor 210. In some examples, the controller 216 may comprise camera control hardware and/or software, which may comprise hardware and/or software to control a shutter speed, aperture size, ISO, frame rate, etc. associated with each of the cameras (e.g., a first camera associated with the first fisheye lens 204 and first sensor 206 and a second camera associated with the second fisheye lens 208 and the second sensor 210). The controller 216 may also coordinate the cameras, such as calibrating the cameras, synchronizing the cameras (e.g., timing their respective shutters to open/close at substantially the same time (within technical tolerances), setting their ISOs to a same value), etc. In some examples, the controller 216 may receive data related to a pattern projected by the illuminator 212 and/or may control the pattern projected by the illuminator 212. The controller 216 may use the pattern data to generate a stereo image based at least in part on the output signals received from the first sensor 206 and/or the second sensor 210 and/or otherwise match and/or synchronize the images received from the first sensor 206 and/or the second sensor 210.

Additionally, or alternatively, the controller 216 may determine a depth measurement based at least in part on the output signals received from the first sensor 206 and the second sensor 210 (e.g., based at least in part on images received from the first sensor 206 and the second sensor 210). In some examples, the controller 216 may be configured to conduct camera control and calibration, but the depth measurements may be performed by software executing on processor(s) 218 (e.g., a software component comprising depth model 220). In some examples, the controller 216 may comprise an application-specific integrated circuit (ASIC), field programmable gate array (FPGA) or other hardware to perform the depth measurements.

Regardless of whether the depth measurement (and/or a depth map) is determined by software executing on the processor(s) 218 or by hardware of the controller 216, a depth measurement may be generated based at least in part on the output signals of the first sensor 206 and the second sensor 210 by providing the output signals and/or a representation thereof to a depth model 220 (whether the depth model 220 is located in memory accessible to the processor(s) 218, a memory of an ASIC, and/or is configured in hardware on the ASIC or FPGA) and receiving the depth measurement from the depth model 220. Additionally, or alternatively, the depth measurement may be determined by calculating the disparity map between two images received from the first sensor 206 and the second sensor 210, respectively.

In some examples, the depth model 220 may comprise a machine-learned model which may include, but is not limited to a neural network (e.g., You Only Look Once (YOLO)

neural network, VGG, DenseNet, PointNet, convolutional neural network (CNN), stacked auto-encoders, deep Boltzmann machine (DBM), deep belief networks (DBN),), regression algorithm (e.g., ordinary least squares regression (OLSR), linear regression, logistic regression, stepwise regression, multivariate adaptive regression splines (MARS), locally estimated scatterplot smoothing (LOESS)), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), supervised learning, unsupervised learning, semi-supervised learning, etc. Additional or alternative examples of neural network architectures may include neural networks such as ResNet50, ResNet101, VGG, DenseNet, PointNet, and the like. Although discussed in the context of neural networks, any type of machine-learning may be used consistent with this disclosure. For example, machine-learning algorithms may include, but are not limited to, regression algorithms, instance-based algorithms, Bayesian algorithms, association rule learning algorithms, deep learning algorithms, etc.

The depth measurement may comprise an indication of a distance to an object 222 from the camera system 202 (and/or, more particularly, to the first sensor 206 and/or the second sensor 210 and/or to the first fisheye lens 204 and/or the second fisheye lens 208). In some examples, the depth measurement may comprise a single distance to a discrete location on object 222. In an additional or alternate example, the depth measurement may comprise a set of distances (e.g., a depth map, which may a two-dimensional, three-dimensional, etc. indication of a set of distances to different discrete points in the environment) and/or a representation thereof (e.g., a point cloud representation of an object in the environment, which may be reconstructed from one or more depth maps). For example, the depth model 220 may be trained to output a depth map and/or point cloud based at least in part on receiving, as input, output signals (and/or representations thereof, such as an image and/or stereo image) received from the first sensor 206 and/or the second sensor 210. In an additional or alternate example, the depth map and/or point cloud may be generated based at least in part on determining a disparity map between a first image associated with an output signal of the first sensor 206 and a second image associated with an output signal of the second sensor 206.

In some examples, the architecture 200 may comprise an additional camera 226, which may comprise a third lens 228 and a third sensor 230. The third lens 228 may comprise a rectilinear lens although, in additional or alternate examples, the third lens 228 may comprise any type of lens. In some examples, the third sensor 230 may generate an output signal based at least in part on receiving a second type of radiation 232. For example, the second type of radiation 232 may comprise visible light wavelengths (e.g., wavelengths of about 350 nanometers to about 750 nanometers). In some examples, the third sensor 230 may have a greater number of pixels than the first sensor 206 and/or the second sensor 210, although in additional or alternate examples, the first sensor 206 and/or the second sensor 210 may have the same or a greater number of pixels than the third sensor 230. For example, the third sensor 230 may be associated with a primary imagery camera. In other words, whereas the camera system 202 may be primarily purposed to generate depth measurement(s) (although, in additional or alternate examples, may display/transmit/store for user-retrieval the images generated by the first sensor 206 and/or the second sensor 210), the third sensor 230 may be used for images that may be displayed, stored, and/or that may be retrievable by a user and/or application. In some examples, the first sensor 206 and second sensor 210 may have lower resolution than the third sensor 228. By way of example and not limitation, the first sensor 206 and/or the second sensor 210 may comprise monochrome 1 megapixel sensors whereas the third sensor 228 may be a color high-resolution sensor (e.g., 8 megapixel sensor, 10 megapixel sensor, 16 megapixel sensor, 20 megapixel sensor). It is contemplated that, in variations of this example the first sensor 206 and/or the second sensor 210 may sense more than one color/wavelength spectrum, may have more or less megapixels, etc. In some examples, an image signal processor 234 may process the output signal associated with the third sensor 230, which may comprise converting an analog signal to a digital signal, generating a RAW file, and/or otherwise generating an image for storage and/or transmission by the processor(s) 218. In some examples, the controller 216 may transmit control signals to respective portions of the camera system 202 to synchronize image capture by the first sensor 206 and/or the second sensor 210 to be at substantially the same time (within technical tolerances) of an image captured by the third sensor 230.

Once the depth measurement has been determined, whether the depth measurement was determined by the controller 216 and/or the processor(s) 218 and/or whether the depth measurement comprises a single and/or multiple distances, a depth map, a point cloud, and/or some other representation of depth measurement(s), the depth measurement may be stored in a memory 224, transmitted to another device, and/or used by an application 236 running on the processor(s) 218 to accomplish a task (e.g., the application 236 may comprise a task that comprises robotic control, facial recognition, biometric feature detection/aggregation, virtual/augmented reality simulation, image overlay/editing, background replacement, etc.). In some examples, the processor(s) 218 may associate the depth measurement(s) with an image generated in association with the third sensor 228. For example, the processor(s) 218 may store an image generated by the image signal processor 234 in association with a depth map in the memory 224, application 236 may use the image and/or depth measurement(s) to accomplish a task (e.g., verify the identity of a user, edit the image, overly a virtual reality simulation over an image of the user, delete a background portion of an image), etc.

In some examples, the processor(s) 218 may rectify image(s) generated by the first sensor 206 and/or the second sensor 210. For example, rectifying the image(s) may comprise "defishing" the images by remapping, warping, and/or otherwise re-projecting the image(s) into an imitation of a rectilinear projection image. In some examples, the processor(s) 218 may do this to align and/or match a portion of the image(s) with a rectilinear image generated by the third sensor 228.

In some examples, the processor(s) 218 may any suitable processor capable of executing instructions to process data and perform operations as described herein. By way of example and not limitation, the processor(s) 218 may comprise one or more central processing units (CPUs), graphics processing units (GPUs), integrated circuits (e.g., application-specific integrated circuits (ASICs), etc.), gate arrays (e.g., field-programmable gate arrays (FPGAs), etc.), application processors, and/or any other device or portion of a device that processes electronic data to transform that electronic data into other electronic data that may be stored in registers and/or memory. For example, where the camera system 202 is integrated into a smartphone and/or tablet device, the processor(s) 218 may comprise at least one application processor.

In some examples, the memory 224 may be an example of non-transitory computer-readable media. The memory 224 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some examples, the depth model 220 may be stored on the memory 224 and executed by an application 236 running on the processor(s) 218. In an additional or alternate example, the depth model 220 may be configured on the controller 216. For example, the depth model 220 may be configured as a hardware portion of the controller 216 and/or the depth model 220 may comprise neural network weights stored in a memory of an ASIC associated with the controller 216. In some examples, the controller 216 may perform on-the-fly encryption to encrypt weights associated with the depth model 220, regardless of the type of machine-learned model associated with the depth model 220.

Example Images

Figure 3A:
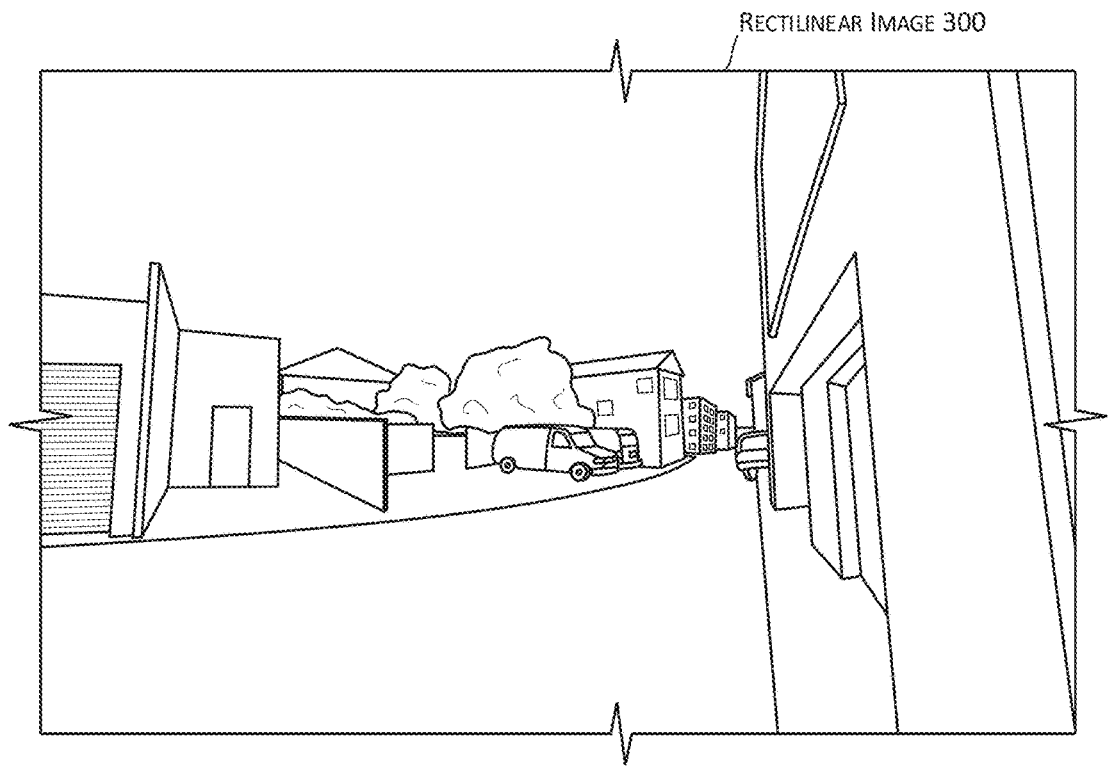
FIG. 3A illustrates a representation of an image of an environment captured using a rectilinear lens.
Figure 3B:
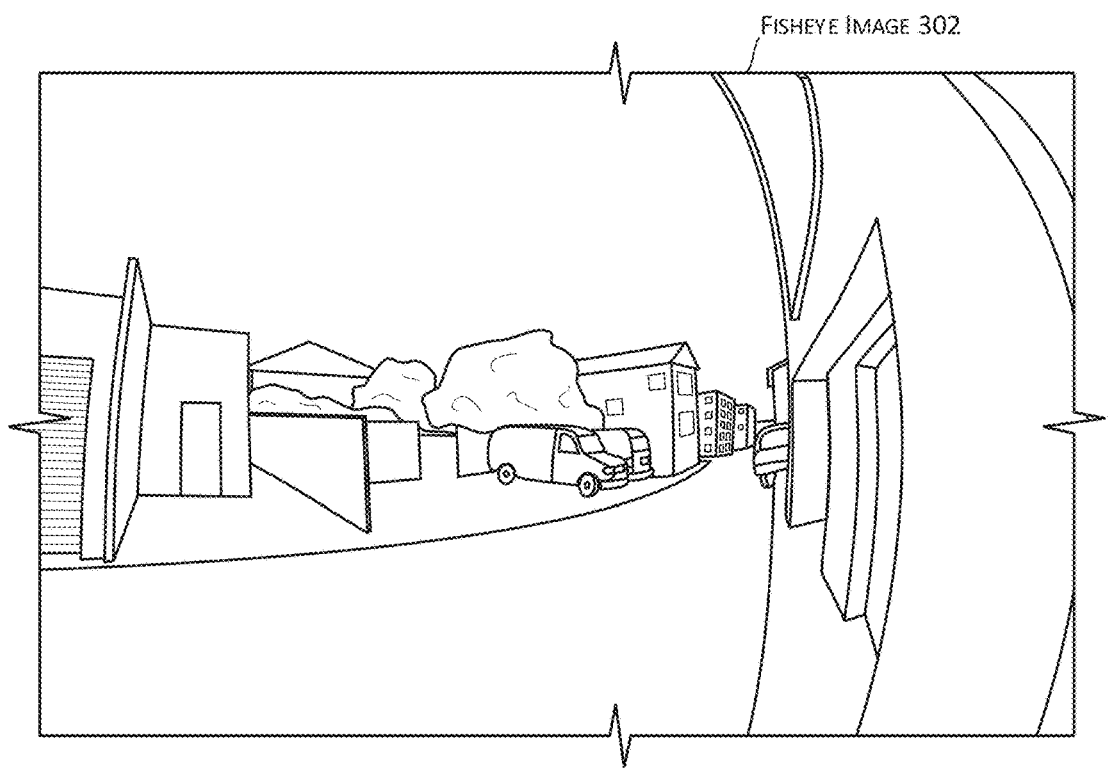
FIG. 3B illustrates a representation of a (portion of) an image of an environment captured using a fisheye lens.

FIG. 3A depicts a representation of an image taken with a rectilinear lens ("rectilinear image 300"), whereas FIG. 3B depicts a representation of a (portion of) an image taken with a fisheye lens ("fisheye image 302"). Of note, rectilinear lenses refract light such that objects further from the center of image appear "stretched" in comparison to objects at the center of the image. This is due to perspective projection of such lenses. Functionally, this means that the greater the angle of incidence of light on the rectilinear lens (, the same increase in the angle of refraction, results in traversing a greater number of pixels on the sensor to which the light will be refracted (i.e., the distance from the optical center on the sensor plane is proportional to the tangent of angle of incidence). This "stretch" is compensate for by downscaling the center of the image, which results in the center of the image appearing to be smaller. Moreover, the greater the FOV of the rectilinear lens, the more that the center needs to be downscaled to fit the FOV of the lens. Note that this downscaling of the center of the image results in a "normal"-looking image, as depicted in rectilinear image 300, and also reduces the apparent size of objects at the center of the image. For example, compare the apparent size of the van in the center of the rectilinear image 300 to the apparent size of the van in the center of the fisheye image 302.

Whereas the fisheye lens may be designed to refract light such that the scale of the objects in the FOV may be directly proportional to the angle of incidence of light on the fisheye lens. In other words, a same increase in the angle of incidence will cause the same increase of the distance of the optical axis of the point of intersection between the sensor and the refracted ray. The dependency of the distance d from the optical axis on the sensor on the angle of incidence $\alpha$ for a fisheye lens may be represented as $d=k\alpha$. This results in distortion towards the edges of the image and magnifies a center of the image, as can be seen in fisheye image 302, and also enables fisheye lenses to refract light from received from a substantially higher FOV in comparison to rectilinear lenses. This motivates use of fisheye lenses as wide-angle lenses to capture more of an environment in an image in comparison to an amount of an image capturable by a rectilinear lens. For example, a fisheye lens may have a FOV between 100 and 270 degrees, with FOVs between 160 and 180 degrees being somewhat more common, and rectilinear lenses having vastly varying FOVs, depending on the focal length of the system, but with common applications having FOVs that do not commonly exceed 80 degrees, and frequently range between 10 and 60 degrees. For example, the dependency of the distance d from the optical axis on the sensor on the angle of incidence $\alpha$ for a rectilinear lens may be represented as $d=k\tan(\alpha)$. However, as discussed in more detail below, the fisheye lens is being used to generate a narrow FOV, contrary to conventional use.

Figure 3C:
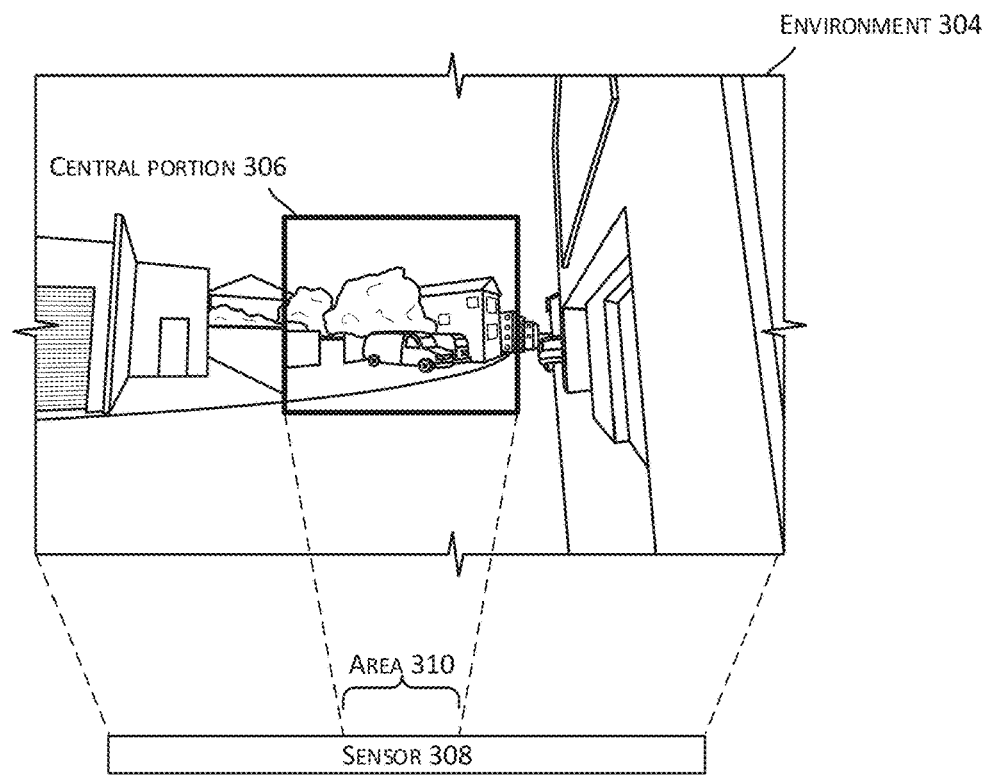
FIG. 3C illustrates the area of light incident on a sensor attributable to a central portion of a field of view when the light is refracted by a rectilinear lens.
Figure 3D:
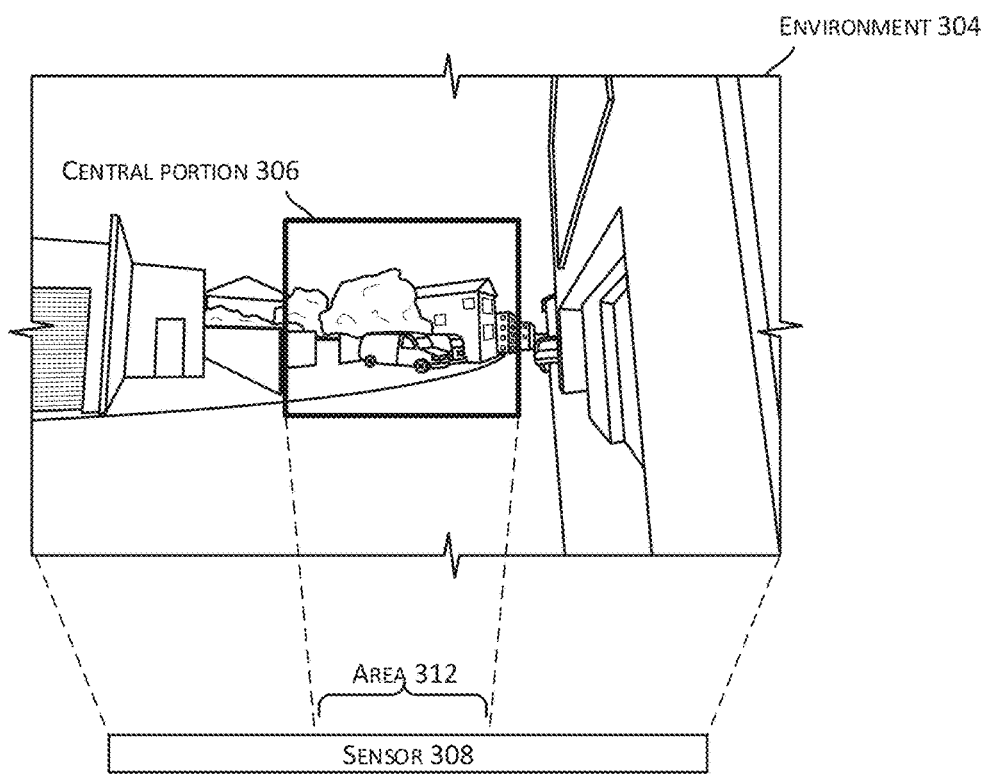
FIG. 3D illustrates the area of light incident on a sensor attributable to a central portion of a field of view when the light is refracted by a fisheye lens.

FIGS. 3C and 3D contrast the area of a sensor upon which light attributable to a center of a FOV is incident using a rectilinear lens versus using a fisheye lens. FIGS. 3C and 3D both depict a representation of an environment 304 depicted in rectilinear image 300 and fisheye image 302 and a central portion 306 of a FOV of the environment 304 that is visible to a lens. FIG. 3C schematically represents refraction of light attributable to the central portion 306 through a rectilinear lens (unillustrated for simplicity) to a sensor 308 and FIG. 3D schematically represents refraction of light attributable to the central portion 306 through a fisheye lens (unillustrated for simplicity) to the sensor 308. Sensor 308 is depicted cross-sectionally and the area of light projected thereon one-dimensionally. Sensor 308 may represent first sensor 206 and/or second sensor 210. Refraction of light attributable to the central portion 306 through a rectilinear lens is incident on an area 310 of the sensor 308, whereas refraction of light attributable to the central portion 306 through a fisheye lens is incident on an area 312 of the sensor 308. As schematically depicted in FIGS. 3C and 3D, the area 312 is larger than the area 310. Use of a fisheye lens causes a distortion that slightly magnifies the center of the FOV, while compressing the sides of the FOV, whereas the rectilinear lens has the opposite effect. An image produced by a camera using a fisheye lens, as in FIG. 3D, would thereby include a greater number of pixels (higher resolution) associated with the central portion 306 than an image produced by a camera using a rectilinear lens. In some examples, an image generated by a camera using a fisheye lens would comprise additional pixels attributable to facial features of a user (e.g., iris, eyes, eyebrows, nose, mouth), since users tend to be centered in images (particularly selfies), at least in some instances. Use of the fisheye lens may thereby increase the amount of pixels attributable to facial feature(s) and may thereby increase the accuracy of biometric scanning and/or recognition.

Example Architecture

Figure 4A:
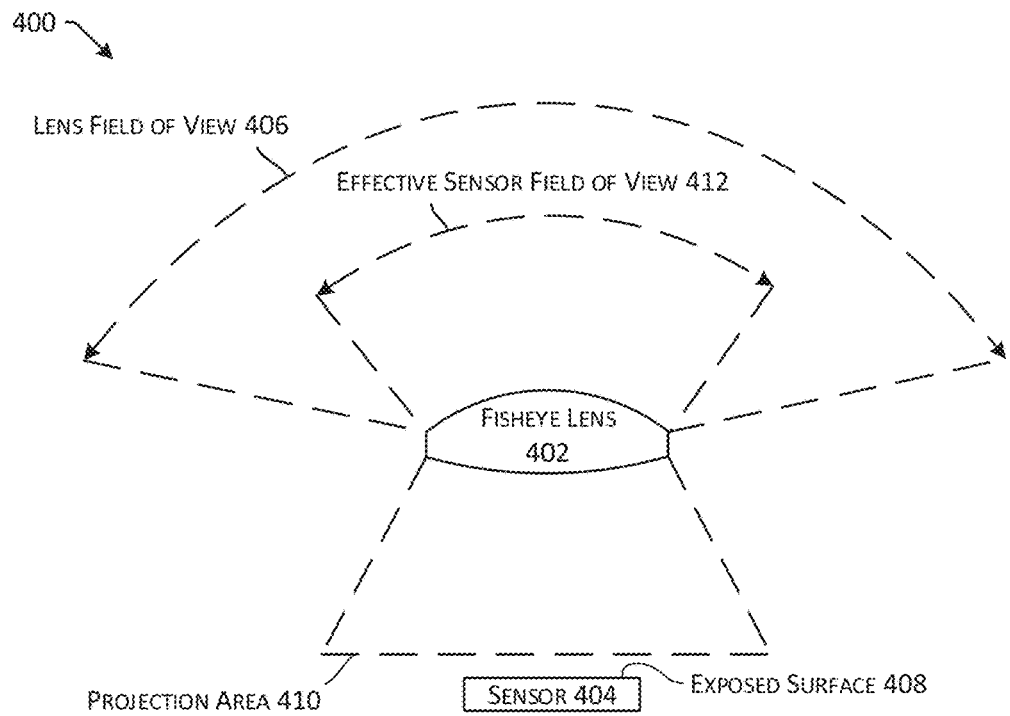
FIG. 4A illustrates a cross section of an example fisheye lens, associated sensor, and respective fields of view of the lens and sensor, respectively.

FIG. 4A depicts a cross section of an architecture 400 of a fisheye lens 402 and sensor 404 according to the camera system 202 discussed above. Fisheye lens 402 may represent fisheye lens 204 and/or fisheye lens 208 and sensor 404 may represent first sensor 206 and/or second sensor 210. According to the techniques discussed herein, instead of utilizing the fisheye lens 402 as a wide-angle lens to capture an image of more of the environment, the techniques discussed herein may comprise utilizing the fisheye lens 402 as a narrow FOV lens. For example, employing the fisheye lens 402 may comprise adjusting a curvature of one or more lenses of the fisheye lens 402 to reduce the FOV, adjusting a spacing of the fisheye lens 402 from a sensor 404, and/or cropping a substantial portion of the FOV of the fisheye lens 402 by virtue of the architecture 400 discussed herein. Although one or more of these methods may be used to magnify a center of the FOV while reducing the effective FOV of the resultant image, the architecture 400 is an example of narrowing the FOV based at least in part on cropping and/or sensor-lens spacing.

By using the fisheye lens 402 and capturing an image of less than the entire FOV of the fisheye lens 402, the depth model 220 may produce more accurate and/or detailed depth measurement(s). Moreover, in facial recognition and biometric use cases, the architecture 400 may increase a likelihood and/or accuracy of detecting an iris of a user and/or a distance of the iris from the architecture 400 where the iris is still detectable, since the center of the image captured by the sensor 404 is uncompressed.

In the depicted example, the fisheye lens 402 is designed to have a FOV of 180 degrees ("lens field of view 406"). Note that, for the sake of discussion, although the FOV may vary along different axes (e.g., a vertical FOV may be different than a horizontal FOV), we assume, for the sake of simplicity, that the FOV is 180 degrees horizontally and vertically, although, in an additional or alternate example, the fisheye lens 402 may be designed to have a FOV that is different along different axes of the lens. Moreover, for the techniques discussed herein, the FOV of the fisheye lens 402 may be adjusted based on the device and/or the use for which the camera system 202 is integrated. Although discussed herein as being a fisheye lens, any lens which magnifies a central portion of the resultant image may be used.

The fisheye lens 402 (and/or other accompanying lenses) may be designed to refract light incident on an outer surface of the fisheye lens 402 towards the sensor 404. In some examples, the sensor 404 may be designed to generate an output signal based at least in part on light incident on an exposed surface 408 of the sensor 404. According to the techniques discussed herein, the exposed surface 408 may have a surface area that is less than a projection area 410 of the light refracted through the fisheye lens 402 towards the sensor 404. Accordingly, the sensor 404 has an effective field of view 412 that is less than the lens field of view 406.

In some examples, the size of the exposed surface 408 of the sensor 404 and/or the size of the projection area 410 may be designed so that the sensor 404 has an effective FOV 412 between 40 and 60 degrees. For a fisheye lens 402 having a FOV of 180 degrees, the architecture 400 crops between 120 and 140 degrees of the FOV. The amount by which the lens FOV 406 is cropped depends on the device into which the camera system is incorporated and/or use for the camera system 202. The effective sensor field of view 412 may depend on the anticipated distance of the subject from the camera system. For example, the placement and size of the sensor 404 may be designed such that the further the subject is anticipated to be, the narrower the effective sensor field of view 412 may be. To illustrate, for integrating the camera system 202 into a smartphone as a front-facing system, the effective sensor FOV 412 may be 60 degrees, whereas as an environment-facing camera, the effective sensor FOV 412 may be 40 degrees.

Figure 4B:
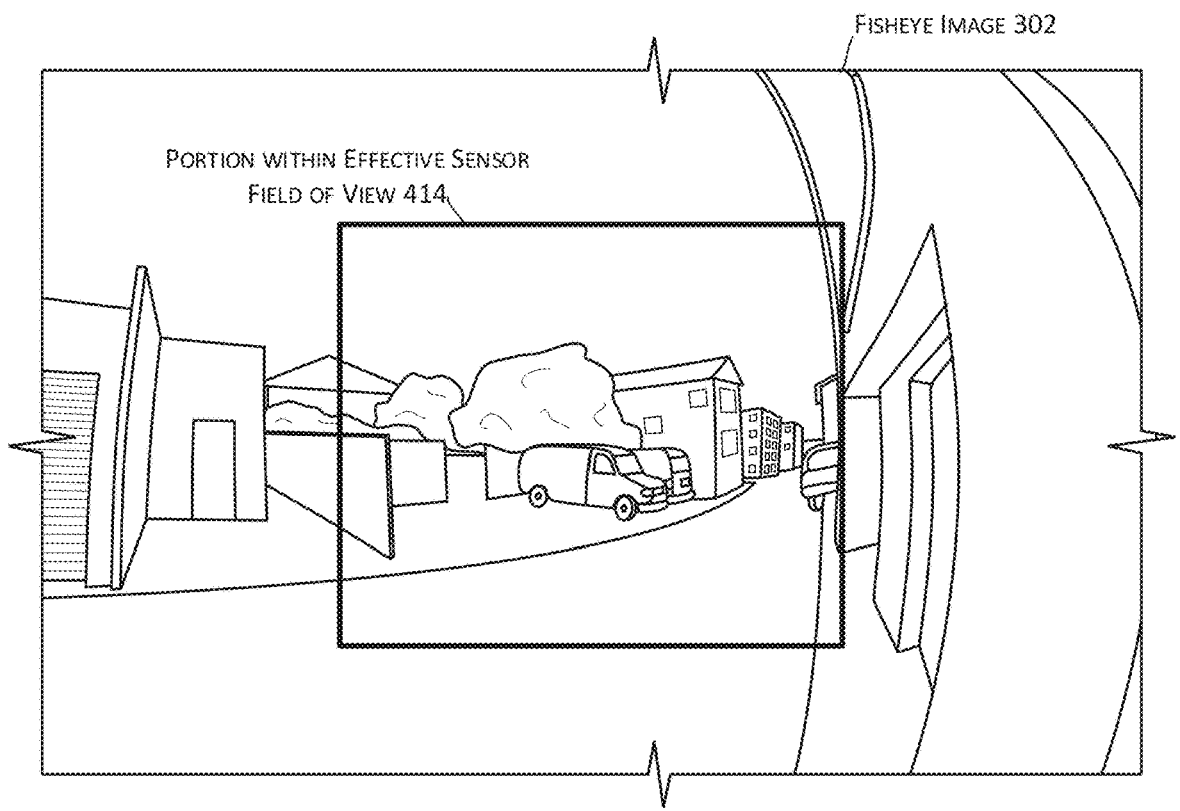
FIG. 4B illustrates a representation of an image taken with a fisheye lens and an example portion of the fisheye image that may be within the effective field of view of the sensor.

FIG. 4B depicts a representation of a (portion of) an image taken with a fisheye lens (fisheye image 302) and an example portion 414 of the fisheye image 302 that may be within the effective FOV 412 of the sensor 404. The example portion 414 is not drawn to scale, nor does fisheye image 302 include an entire 180-degree FOV, but the example portion 414 illustrates, in part, the drastic reduction in FOV accomplished by the architecture 400 discussed herein.

Example Process

Figure 5:
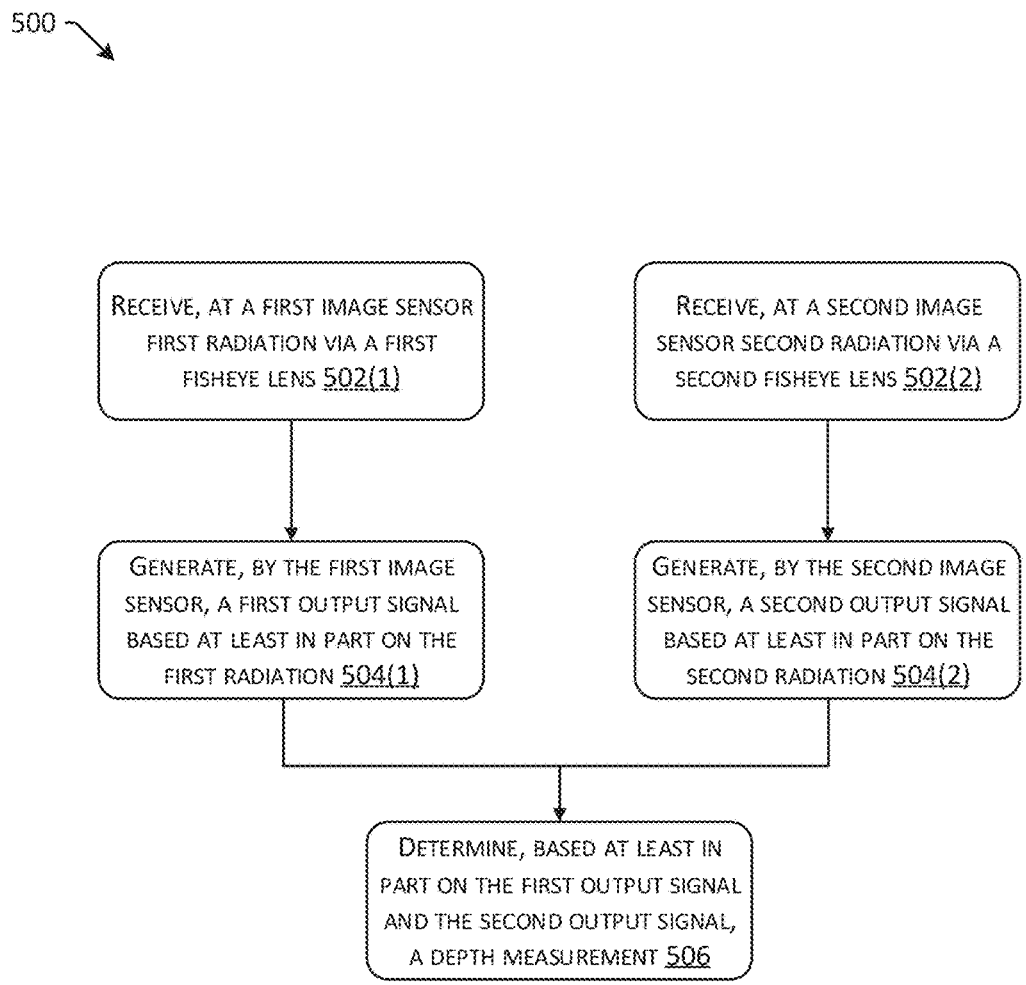
FIG. 5 illustrates a flow diagram of an example process for generating a depth measurement using the camera system described herein.

FIG. 5 illustrates a flow diagram of an example process 500 for generating a depth measurement using the camera system described herein. In some examples, the example process 500 may be accomplished by the camera system 202 discussed herein.

At operation 502(1) and/or 502(2), the example process 500 may comprise receiving, at an image sensor radiation via a fisheye lens, according to any of the techniques discussed herein. For example, two sensors may receive radiation from a same and/or different fisheye lenses. In some examples, the radiation received by the sensor may comprise near-infrared and/or infrared light that may be naturally available in an environment surrounding the camera system and/or near-infrared and/or infrared light introduced emitted into the environment by an emitter of the camera system.

At operation 504(1) and/or 504(2), the example process 500 may comprise generating, by an image sensor, an output signal based at least in part on the radiation, according to any of the techniques discussed herein. For example, the sensor may be configured to output an output signal indicative of the light incident on the sensor. In some examples, the output signal may comprise voltage(s), amplitude(s), current(s), and/or other indication(s) of magnitude associated with one or more pixels.

At operation 506, the example process 500 may comprise determining, based at least in part on a first output signal and/or a second output signal, a depth measurement, according to any of the techniques discussed herein. In some examples, the camera system 202 may comprise two cameras/a sensor pair. In such an example, a depth measurement may be generated by a depth model based at least in part on the first output signal and/or second output signal generated by the sensor pair. In some examples, generating the depth measurement using the depth model may comprise providing, as input to a machine-learned model, the first output signal, the second output signal, and/or representation(s) thereof and receiving, from the machine-learned model and responsive to the provision, a depth measurement.

Example Clauses

A. A system comprising: an illuminator configured to emit a first type of radiation; a fisheye lens; a first image sensor configured to generate a first output signal based at least in part on receiving first light via the fisheye lens, the first light comprising the first type of radiation; a second image sensor configured to generate a second output signal based at least in part on receiving second light via a second lens, the second light comprising at least one of the first type of radiation or a second type of radiation; and a controller operatively connected to the first image sensor and the second image sensor and configured to generate, based at least in part on the first output signal, a depth map of an environment visible in a field of view of the first image sensor and the second image sensor.

B. The system of paragraph A, wherein a first field of view of the first image sensor and a second field of view of the second image sensor overlap.

C. The system of either paragraph A or B, wherein generating the depth map comprises: providing, as input to a machine-learned model, at least one of the first input signal or a representation of the first input signal; and receiving, from the machine-learned model, the depth map.

D. The system of any one of paragraphs A-C, wherein the first type of radiation includes infrared light or near-infrared light and the second type of radiation includes visible light.

E. The system of any one of paragraphs A-D, wherein the first image sensor comprises at least one of a monochrome infrared sensor or a monochrome near-infrared sensor.

F. The system of any one of paragraphs A-E, wherein: the controller comprises a processor; and generating the depth map is based at least in part on the processor executing instructions stored in a memory, the instructions stored in the memory comprising one or more weights of the neural network.

G. The system of any one of paragraphs A-F, wherein the controller comprises an application-specific integrated circuit (ASIC) or a field-programmable gate array (FPGA).

H. A device comprising: a first curvilinear lens; a first image sensor configured to generate a first output signal responsive to receiving first radiation via the first curvilinear lens; and a controller comprising a depth model, the controller configured to: receive, as input, the first output signal; and output, based at least in part on the first output signal, a depth measurement.

I. The device of paragraph H, wherein: the controller comprises an application processor; and the depth model is executed by the application processor.

J. The device of either paragraph H or I, wherein: the controller comprises an application-specific integrated circuit (ASIC) or a field-programmable gate array (FPGA); and the ASIC is configured to at least one of store or execute the depth model.

K. The device of any one of paragraphs H-J, further comprising an illuminator configured to emit radiation of a first type, and wherein the first radiation and the second radiation are of the first type and comprise radiation that reflects from an object responsive to the radiation emitted by the illuminator.

L. The device of any one of paragraphs H-K, wherein the first type comprises at least one of infrared light or near-infrared light.

M. The device of any one of paragraphs H-L, further comprising a second lens and a second sensor, wherein: the second sensor is configured to generate a second output signal based at least in part on receiving second radiation via the second lens, the second radiation being a second type of radiation different than the first type.

N. The device of any one of paragraphs H-M, wherein a field of view associated with the first image sensor is less than or equal to BM degrees.

O. A method comprising: receiving, at a first image sensor, first radiation via a first curvilinear lens; receiving, at a second image sensor, second radiation via a second curvilinear lens; generating, by the first image sensor, a first output signal based at least in part on the first radiation; generating, by the second image sensor, a second output signal based at least in part on the second radiation; and determining, based at least in part on the first output signal and the second output signal, a depth measurement.

P. The method of paragraph O, wherein determining the depth measurement is based at least in part on: providing, as input to a depth model, the first output signal and the second signal or a representation thereof; and receiving, from the depth model, the depth measurement.

Q. The method of either paragraph O or P, wherein determining the depth measurement is based at least in part on determining a disparity between the first output signal and the second output signal.

R. The method of any one of paragraphs O-Q, wherein the first radiation and the second radiation comprise at least one of infrared light or near-infrared light.

S. The method of any one of paragraphs O-R, further comprising: receiving, at a third image sensor, third radiation via a lens; generating, by the third image sensor, a third output signal based at least in part on the third radiation; and causing at least one of display or storage of an image, based at least in part on the third output signal.

T. The method of any one of paragraphs O-S, further comprising: emitting, by an illuminator, radiation, wherein: the first radiation and the second radiation are received based at least in part on reflection of the radiation by an object, and the depth measurement includes a distance from the object to at least one of the first image sensor or the second image sensor.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
an illuminator configured to emit a first type of radiation;
a fisheye lens characterized by a field of view (FOV);
a first image sensor configured to generate a first output signal based at least in part on a portion of first light received via the fisheye lens, the first light characterized by the first type of radiation, wherein the first image sensor is further configured to crop the FOV of the fisheye lens so that only a portion of the first light in a central portion of the FOV of the fisheye lens remains, wherein a curvature of one or more lenses of the fisheye lens and a spacing of the fisheye lens from the first image sensor is modified to adjust an effective sensor FOV of the fisheye lens;
a second image sensor configured to generate a second output signal based at least in part on receiving second light via a second lens, the second light comprising at least one of the first type of radiation or a second type of radiation; and
a controller operatively connected to the first image sensor and the second image sensor and configured to:
generate, based at least in part on the first output signal, a depth map of an environment visible in a field of view of the first image sensor and the second image sensor.

2. The system of claim 1, wherein a first field of view of the first image sensor and a second field of view of the second image sensor overlap.

3. The system of claim 1, wherein generating the depth map comprises:
providing, as input to a machine-learned model, at least one of the first output signal or a representation of the first output signal; and
receiving, from the machine-learned model, the depth map.

4. The system of claim 1, wherein the first type of radiation includes infrared light or near-infrared light and the second type of radiation includes visible light.

5. The system of claim 1, wherein the first image sensor comprises at least one of a monochrome infrared sensor or a monochrome near-infrared sensor.

6. The system of claim 1, wherein:
the controller comprises a processor; and
generating the depth map is based at least in part on one or more processors executing instructions stored in a memory, the instructions stored in the memory comprising one or more weights of a neural network.

7. The system of claim 1, wherein the controller comprises an application-specific integrated circuit (ASIC) or a field-programmable gate array (FPGA).

8. A device comprising:
a first fisheye lens characterized by a field of view (FOV);
a first image sensor configured to generate a first output signal responsive to a portion of first radiation via the first fisheye lens, wherein the first image sensor is further configured to crop the FOV of the fisheye lens so that only a portion of the first radiation in a central portion of the FOV of the fisheye lens remains, wherein a curvature of one or more lenses of the fisheye lens and a spacing of the fisheye lens from the first image sensor is modified to adjust an effective sensor FOV of the fisheye lens; and
a controller comprising a depth model, the controller configured to:
receive, as input, the first output signal; and
output, based at least in part on the first output signal, a depth measurement.

9. The device of claim 8, wherein:
the controller comprises an application processor; and
the depth model is executed by the application processor.

10. The device of claim 8, wherein:
the controller comprises an application-specific integrated circuit (ASIC) or a field-programmable gate array (FPGA); and
the ASIC is configured to at least one of store or execute the depth model.

11. The device of claim 8, wherein the first radiation is characterized by a first type of radiation comprising at least one of infrared light of near-infrared light.

12. The device of claim 8, further comprising a second lens and a second sensor, wherein:
the second sensor is configured to generate a second output signal based at least in part on receiving second radiation via the second lens, the second radiation characterized by a second type of radiation different than a first type of radiation characterizing the first radiation.

13. The device of claim 8, further comprising an illuminator configured to emit radiation of a first type, and wherein the first radiation comprises radiation that reflects from an object responsive to the radiation emitted by the illuminator.

14. The device of claim 8, wherein a field of view associated with the first image sensor is less than or equal to 65 degrees.

15. A method comprising:
receiving, at a first image sensor, first radiation via a first fisheye lens characterized by a field of view (FOV);
receiving, at a second image sensor, second radiation via a second fisheye lens;
generating, by the first image sensor, a first output signal based at least in part on the first radiation, wherein the first image sensor crops the FOV of the fisheye lens so that only a portion of the first radiation in a central portion of the FOV of the fisheye lens remains, wherein a curvature of one or more lenses of the fisheye lens and a spacing of the fisheye lens from the first image sensor is modified to adjust an effective sensor FOV of the fisheye lens;
generating, by the second image sensor, a second output signal based at least in part on the second radiation; and
determining, based at least in part on the first output signal and the second output signal, a depth measurement.

16. The method of claim 15, wherein determining the depth measurement is based at least in part on:
providing, as input to a depth model, the first output signal and the second signal or a representation thereof; and
receiving, from the depth model, the depth measurement.

17. The method of claim 15, wherein determining the depth measurement is based at least in part on determining a disparity between the first output signal and the second output signal.

18. The method of claim 15, wherein the first radiation and the second radiation comprise at least one of infrared light or near-infrared light.

19. The method of claim 15, further comprising:
receiving, at a third image sensor, third radiation via a lens;
generating, by the third image sensor, a third output signal based at least in part on the third radiation; and
causing at least one of display or storage of an image, based at least in part on the third output signal.

20. The method of claim 15, further comprising:
emitting, by an illuminator, radiation, wherein:
   the first radiation and the second radiation are received based at least in part on reflection of the radiation by an object, and
the depth measurement includes a distance from the object to at least one of the first image sensor or the second image sensor.

* * * * *